(12) United States Patent
Geng et al.

(10) Patent No.: US 10,771,694 B1
(45) Date of Patent: Sep. 8, 2020

(54) CONFERENCE TERMINAL AND CONFERENCE SYSTEM

(71) Applicant: BOE TECHNOLOGY GROUP CO., LTD., Beijing (CN)

(72) Inventors: Lihua Geng, Beijing (CN); Qingguo Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/561,976

(22) Filed: Sep. 5, 2019

(30) Foreign Application Priority Data

Apr. 2, 2019 (CN) .......................... 2019 1 0260503

(51) Int. Cl.
| | | |
|---|---|---|
| *H04N 7/14* | (2006.01) | |
| *H04N 5/232* | (2006.01) | |
| *H04N 7/15* | (2006.01) | |
| *G06K 9/00* | (2006.01) | |
| *G10L 21/0208* | (2013.01) | |
| *H04R 3/00* | (2006.01) | |
| *G10L 25/51* | (2013.01) | |
| *G10L 15/26* | (2006.01) | |
| *H04R 1/02* | (2006.01) | |
| *H04R 1/08* | (2006.01) | |
| *G10L 21/02* | (2013.01) | |

(52) U.S. Cl.
CPC ..... *H04N 5/23238* (2013.01); *G06K 9/00288* (2013.01); *G10L 15/265* (2013.01); *G10L 21/0202* (2013.01); *G10L 21/0208* (2013.01); *G10L 25/51* (2013.01); *H04N 7/15* (2013.01); *H04R 1/02* (2013.01); *H04R 1/08* (2013.01); *H04R 3/005* (2013.01)

(58) Field of Classification Search
CPC ....................................................... H04N 7/14
See application file for complete search history.

(56) References Cited

U.S. PATENT DOCUMENTS 5,978,014 A * 11/1999 Martin ................ H04L 12/1818
348/14.08
6,771,302 B1 * 8/2004 Nimri .................... H04N 7/147
348/14.08

(Continued)

FOREIGN PATENT DOCUMENTS

| CN | 101080000 A | 11/2007 |
| CN | 102006453 A | 4/2011 |

(Continued)

OTHER PUBLICATIONS

The First Chinese Office Action dated May 6, 2020; Appln. No. 201910260503.5.

*Primary Examiner* — Olisa Anwah

(57) ABSTRACT

Provided are a conference terminal and a conference system are proposed for providing integral conference image in video conference scenes. The conference terminal includes: a plurality of image acquisition devices, each of the image acquisition devices being configured to acquire a partial conference image; and an image processing device configured to receive a plurality of partial conference images from the plurality of image acquisition devices, convert the plurality of partial conference images into one integral conference image, and output the integral conference image.

11 Claims, 8 Drawing Sheets

(56) References Cited

U.S. PATENT DOCUMENTS

| | | | | |
|---|---|---|---|---|
| 8,874,429 B1* | 10/2014 | Crosley | ................ | G06F 17/289 |
| | | | | 704/2 |
| 10,444,955 B2* | 10/2019 | Riley | ................ | G06K 9/6202 |
| 2004/0001137 A1* | 1/2004 | Cutler | ................ | H04N 5/2259 |
| | | | | 348/14.08 |
| 2007/0211934 A1* | 9/2007 | Pan | ................ | G06K 9/32 |
| | | | | 382/154 |
| 2008/0295040 A1* | 11/2008 | Crinon | ................ | H04N 7/152 |
| | | | | 715/865 |
| 2010/0118112 A1* | 5/2010 | Nimri | ................ | H04N 7/142 |
| | | | | 348/14.08 |
| 2010/0128105 A1* | 5/2010 | Halavy | ................ | H04N 7/147 |
| | | | | 348/14.05 |
| 2011/0246172 A1* | 10/2011 | Liberman | ............. | G06F 17/289 |
| | | | | 704/2 |
| 2013/0271559 A1 | 10/2013 | Feng et al. | | |
| 2013/0300821 A1* | 11/2013 | Lankford | ............... | H04N 21/00 |
| | | | | 348/14.08 |
| 2015/0116451 A1* | 4/2015 | Xu | ................ | H04N 7/15 |
| | | | | 348/14.13 |

FOREIGN PATENT DOCUMENTS

| | | |
|---|---|---|
| CN | 102256098 B | 6/2014 |
| CN | 104238576 A | 12/2014 |
| CN | 106487757 A | 3/2017 |
| CN | 107370981 A | 11/2017 |
| CN | 108111799 A | 6/2018 |
| CN | 207443029 U | 6/2018 |
| CN | 109035138 A | 12/2018 |
| EP | 2018058 A1 | 1/2009 |

\* cited by examiner

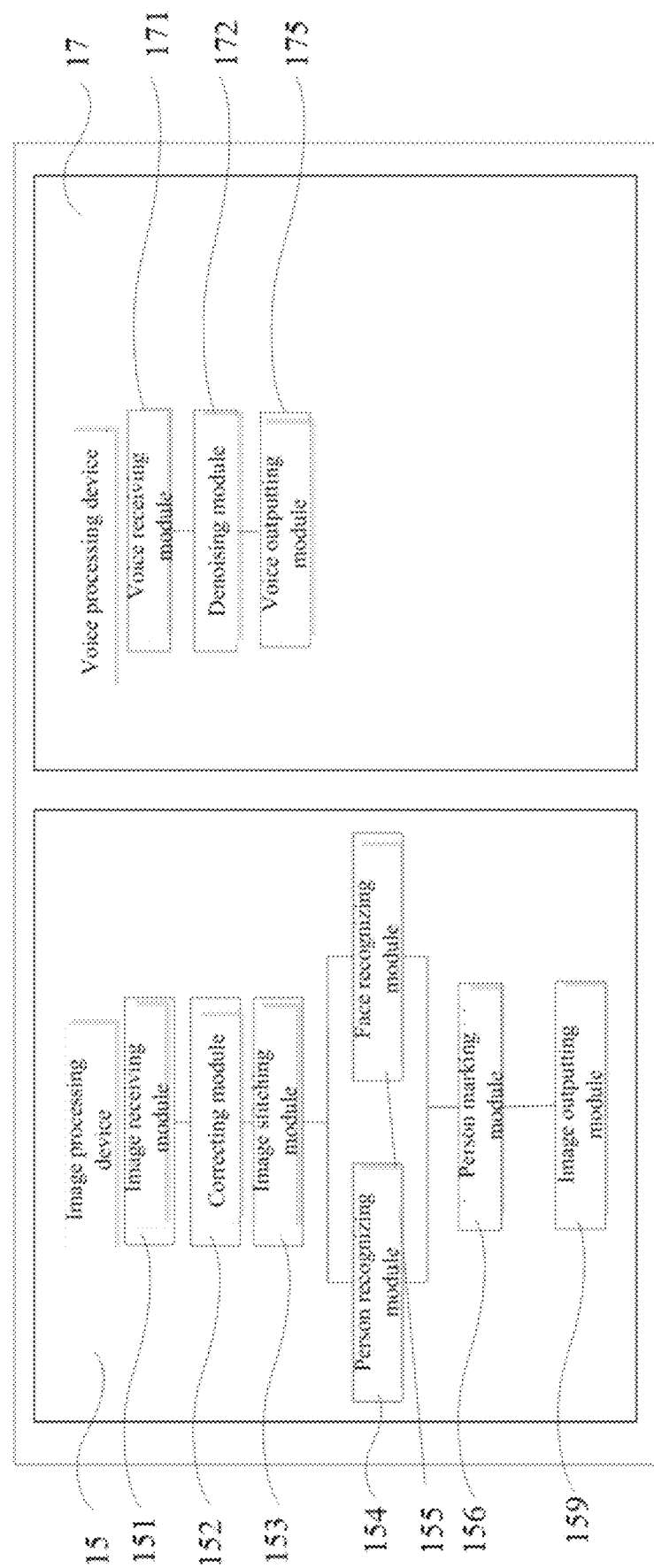

CONFERENCE TERMINAL AND CONFERENCE SYSTEM

CROSS-REFERENCE TO RELATED APPLICATION

The present application claims the priority of a Chinese patent application No. 201910260503.5 filed on Apr. 2, 2019. Herein, the content disclosed by the Chinese patent application is incorporated in full by reference as a part of the present application.

TECHNICAL FIELD

The present application relates to the field of video conference technique, and more particularly, to a conference terminal and a conference system.

BACKGROUND

As a new type of communication tool, video conference has broken through geographical restrictions, and thereby can provide more convenient, flexible, and comprehensive audio and video signal transmission and service, so it has been widely used.

However, in the existing video conference application, the image and voice acquisition terminal of the video conference is very simple, only a single camera is used to acquire images, it is impossible to acquire the images of all the participants of the conference, which manner may cause incomplete acquisition of conference scenes (for example, including conference images, conference voices, and so on), and may cause difficulty for one or more of the participants to understand basic information of the conference or follow up on the conference process (for example, acquisition of identity, location, etc. of the speaker).

Therefore, how to display the conference scenes in a panoramic manner without losing the images of any of the participants in the conference becomes an urgent problem to be solved.

SUMMARY

According to embodiments of the present application, a conference terminal and a conference system are proposed for providing integral conference image in video conference scenes.

According to embodiments of the present application, there is provided a conference terminal, comprising: a plurality of image acquisition devices, each of the image acquisition devices being configured to acquire a partial conference image; and an image processing device configured to receive a plurality of partial conference images from the plurality of image acquisition devices, convert the plurality of partial conference images into one integral conference image, and output the integral conference image.

According to embodiments of the present application, the conference terminal further comprises: a plurality of voice acquisition devices, each of the voice acquisition devices being configured to acquire a partial conference voice; and a voice processing device configured to receive a plurality of partial conference voices from the plurality of voice acquisition devices, convert the plurality of partial conference voices into speech voices, and output the speech voices.

According to embodiments of the present application, the image processing device includes a correcting module, an image stitching module, and an image outputting module; the correcting module is configured to receive the plurality of partial conference images, and correct the plurality of partial conference images into a plurality of planar images respectively; the image stitching module is configured to receive the plurality of planar images outputted by the correcting module, and perform smooth docking on the plurality of planar images to form the integral conference image; the image outputting module is configured to output the integral conference image.

According to embodiments of the present application, the image processing device further includes a person recognizing module and/or a face recognizing module, and a person marking module; the person recognizing module is configured to receive the integral conference image, and identify persons and person locations in the integral conference image to obtain person information and person location information in the integral conference image; the face recognizing module is configured to receive the integral conference image, and identify person names in the integral conference image and determine marking locations of the person names to obtain person name information and marking location information of person names in the integral conference image; the person marking module is configured to receive the person information, the person location information, the person name information, and the marking location information of person names in the integral conference image, and mark the person names in the integral conference image according to the person information, the person location information, the person name information, and the marking location information of person names in the integral conference image, so as to form the integral conference image having person name tags.

According to embodiments of the present application, the voice processing device includes a denoising module and a voice outputting module; the denoising module is configured to receive a plurality of partial voice data, and perform denoising processing on the plurality of partial voice data to obtain speech data; the voice outputting module is configured to receive the speech data, and perform digital-to-analog conversion on the speech data to form speech voices.

According to embodiments of the present application, the conference terminal further comprises: a plurality of voice acquisition devices, each of the voice acquisition devices being configured to acquire a partial conference voice; and a voice processing device configured to receive a plurality of partial conference voices from the plurality of voice acquisition devices, convert the plurality of the partial conference voices into speech voices, and output the speech voices.

According to embodiments of the present application, the voice processing device further includes a voice source orientation determining module, the voice source orientation determining module is configured to receive the speech data, and determine location information of a speaker according to the speech data; the person marking module is configured to receive the location information of the speaker, and form the integral conference image having a person tag of the speaker based on the location information of the speaker, the person information, and the person location information.

According to embodiments of the present application, the voice processing device further includes a voice source orientation determining module, the voice source orientation determining module is configured to receive the speech data, and determine location information of a speaker according to the speech data; the image processing device further includes a demarking module, wherein the marking module forms the integral conference image having person tags of all persons and person name tags of all persons, and the demarking module causes, according to the location information of the speaker, only the speaker to have a person tag in the integral conference image having person tags of all persons and person name tags of all persons, so as to form the integral conference image with person tags of only the speaker and person name tags of all persons.

According to embodiments of the present application, the voice processing device further includes a voice recognizing module; the voice recognizing module is configured to receive the speech data, and convert the speech data into text information; the image processing device further includes a subtitle adding module; the subtitle adding module adds the text information to the integral conference image so as to form the integral conference image having subtitles.

According to embodiments of the present application, the conference terminal further comprises a fixing frame, wherein the plurality of image acquisition devices are circumferentially disposed on an outer surface of the fixing frame, and the plurality of voice acquisition devices are circumferentially disposed on the outer surface of the fixing frame.

According to embodiments of the present application, the conference terminal further comprises a lifting bracket connected to the fixing frame and configured to drive lifting and lowering of the fixing frame.

According to embodiments of the present application, the voice acquisition device is a microphone; the image acquisition device is a wide-angle camera; the fixing frame is an annular fixing frame, a top of an outer surface of the annular fixing frame is uniformly provided with four wide-angle cameras circumferentially, and a central portion of the outer surface of the annular fixing frame is uniformly provided with eight microphones circumferentially.

According to embodiments of the present application, there is provided a conference system comprising: a conference terminal descried above, which is located at a first location; a display device located at a second location and configured to receive and display an integral conference image outputted by the image outputting module of the conference terminal located at the first location; and an acoustic device located at the second location and configured to receive and play speech voices outputted by the voice outputting module of the conference terminal located at the first location.

According to embodiments of the present application, the conferencing system further comprises a conference terminal located at the second location; a display device and an acoustic device located at the first location, wherein the display device at the first location is configured to receive and display the integral conference image outputted by the image outputting module of the conference terminal located at the second location; the acoustic device located at the first location is configured to receive and display speech voices outputted by the voice outputting module of the conference terminal located at the second location.

BRIEF DESCRIPTION OF THE DRAWINGS

FIGS. 7A-7E are schematic block diagrams of a video voice processing system according to an embodiment of the present application;

DETAILED DESCRIPTION OF THE EMBODIMENTS

To further explain the technical means and functions of the present application for achieving the intended objectives of the present application, the specific embodiments, structures, features, and effects of the conference terminal and conference system according to the present application will be described in detail below with reference to the accompanying drawings and preferred embodiments.

Figure 1:
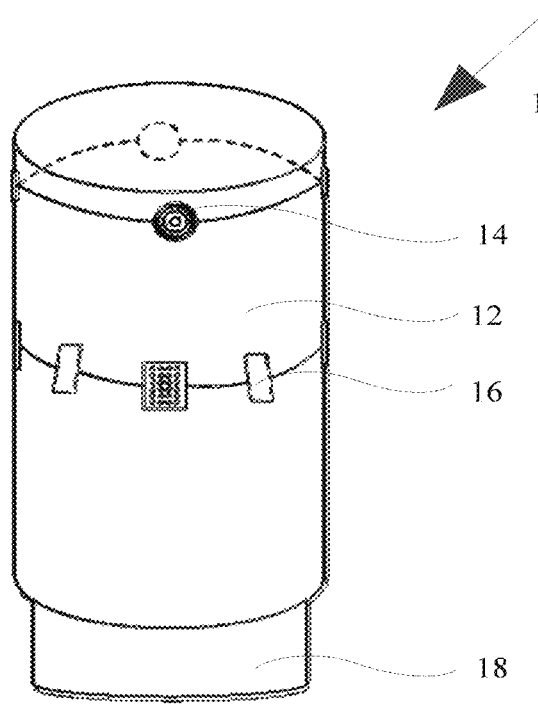
FIG. 1 is a schematic structural diagram of a conference terminal according to an embodiment of the present application.
Figure 2:
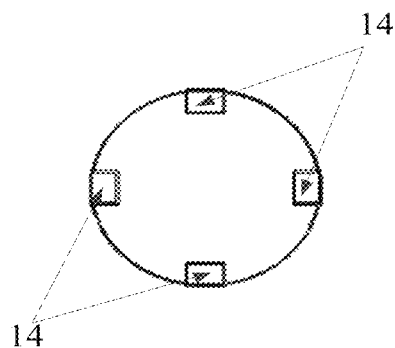
FIG. 2 is a layout diagram of a plurality of video acquisition devices according to an embodiment of the present application.
Figure 3:
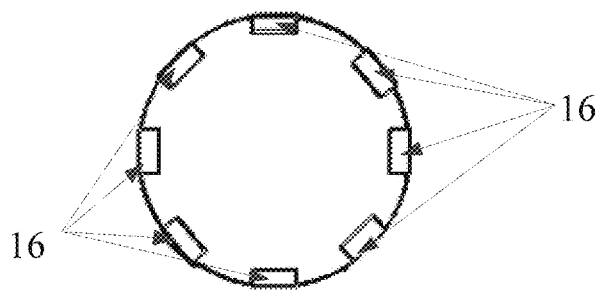
FIG. 3 is a layout diagram of a plurality of voice acquisition devices according to an embodiment of the present application.

As shown in FIGS. 1 to 3, an embodiment of the present application provides a conference terminal 1, which comprises: a plurality of image acquisition devices 14 and an image processing device 15 (not shown in FIGS. 1 to 3).

Each of the plurality of image acquisition device 14 is configured to acquire a partial conference image, a plurality of partial conference images collectively form an integral conference image, and is further configured to output the partial conference image.

The image processing devices 15 is connected to the plurality of image acquisition devices 14 respectively, is configured to receive a plurality of partial conference images and convert the plurality of partial conference images into one integral conference image, and is further configured to output the integral conference image.

In addition, the conference terminal 1 according to an embodiment of the present application may further comprise a fixing frame 12. The plurality of image acquisition devices 14 may be disposed circumferentially on an outer surface of the fixing frame 12.

The conference terminal 1 according to an embodiment of the present application comprises a fixing frame 12, a plurality of image acquisition devices 14, and an image processing device 15. The plurality of image acquisition devices 14 are circumferentially disposed apart one another on the fixing frame 12, and each of the plurality of image acquisition devices 14 acquires a partial conference image in real time. The plurality of partial conference images acquired by the plurality of image acquisition devices 14 collectively form an integral conference image, thereby achieving complete acquisition of the entire conference scene. The plurality of image acquisition devices 14 are connected to the image processing device 15, and the image processing device 15 is configured to process the received plurality of partial conference images in real time to convert the plurality of individual partial conference images into a complete integral conference image. Then the image processing device 15 outputs the complete integral conference image to a display device.

Optionally, the image acquisition device 14 may be a camera. The image acquisition device 14 may also be other devices that can be used to acquire images. The image processing device 15 may be a CPU (Central Processing Unit) or a DSP (Digital Signal Processor) or the like. The image processing device 15 may be provided with a receiving port and an output port. The receiving port and the output port can be protocol interfaces such as an LVDS (Low-Voltage Differential Signaling) interface, MIPI (Mobile Industry Processor Interface), DVI (Digital Visual Interface), HDMI (High Definition Multimedia Interface) or DP (Display Port).

As shown in FIGS. 1 to 3 and 9, conference participants 26 surround a conference table 28, and the conference terminal 1 is disposed at the center of the conference table 28. The conference terminal 1 provided by the present application can completely display the conference image through the connection with the display device, so that the conference image can be viewed with a seamless panoramic view without losing any conference scene and any image of the conference participants, so that the conference participants 26 can not only see the speaker, but also can see the postures, expressions and other information of other conference participants 26, integrity of the conference image is ensured. In addition, when there are many participants and the speaker is repeatedly switched, the conference image displayed in the panorama has clear image and good conference effect, and discomfort due to image spinning and jumping sensation caused on the conference participants by repeated change of direction of the image acquisition device 14 is avoided.

The present application will be further described in detail below with reference to the drawings and embodiments.

Figure 4:
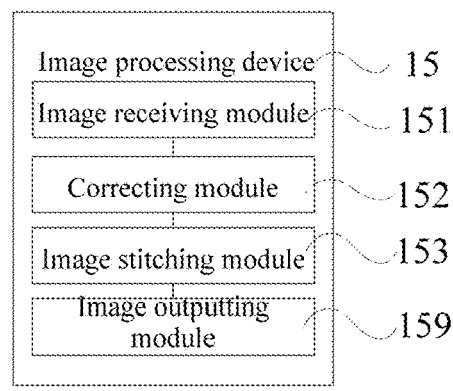
FIG. 4 is a composition block diagram of a video acquisition device according to an embodiment of the present application.

As shown in FIG. 4, in an embodiment of the present application, the image processing device 15 includes a plurality of image receiving modules 151, a correcting module 152, an image stitching module 153, and an image outputting module 159.

Each of the plurality of image receiving modules 151 is connected to one image acquisition device 14, is configured to receive a partial conference image, and is further configured to transmit the partial conference image. The correcting module 152 is connected to the plurality of image receiving modules 151 respectively, is configured to receive a plurality of partial conference images outputted by the plurality of image receiving modules 151 and correct the plurality of partial conference images into a plurality of planar images respectively, and is further configured to transmit the plurality of planar images. The image stitching module 153 is connected to the correcting module 152, and the image stitching module 153 is configured to receive the plurality of planar images outputted by the correcting module 152 and perform smooth seamless docking on the plurality of planar images to form one integral conference image, and the image stitching module 153 is further configured to transmit the integral conference image. The image outputting module 159 is connected to the image stitching module 153 and receives the integral conference image transmitted from the image stitching module 153, and the image outputting module 159 is further configured to output the integral conference image.

In this embodiment, each of the plurality of image receiving modules 151 is connected to an image acquisition device 14, receives a partial conference image and transmits the partial conference image to the correcting module 152. The correcting module 152 receives the plurality of partial conference images transmitted from the plurality of image receiving modules 151, and corrects the plurality of partial conference images simultaneously, so that the plurality of partial conference images are simultaneously corrected into a plurality of planar images, respectively. The image acquisition device 14 may be a wide-angle fisheye camera, the acquired partial conference image is a fisheye image, and the fisheye image is a twisted spherical image which needs to be converted into a planar image for stitching. The present application corrects the fisheye image into a planar image by the correcting module, and transmits the corrected plurality of planar images to the image stitching module 153 for smooth docking. Preferably, the corrected plurality of planar images are transmitted to the image stitching module 153 for smooth seamless docking to form a complete integral conference image. Moreover, the image stitching module 153 transmits the complete integral conference image to the image outputting module 159 for being outputted, and then displayed on the display device. In this way, complete displaying of the conference image is realized, so that the conference image can be viewed with a seamless panoramic view without losing any conference scene and any image of the conference participants, and integrity of the conference image is ensured.

Figure 5:
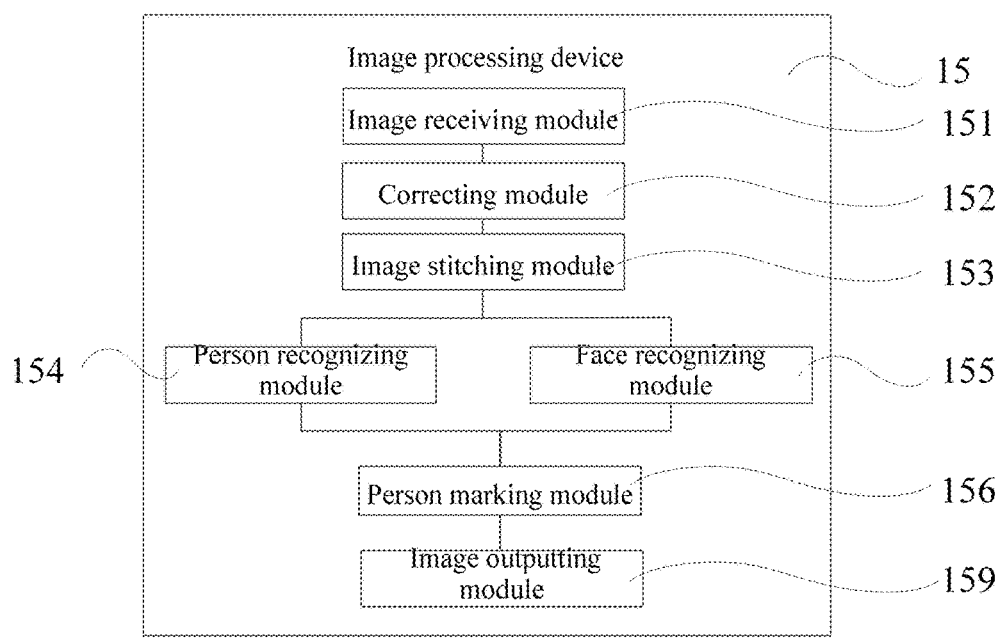
FIG. 5 is a composition block diagram of another video acquisition device according to an embodiment of the present application.

As shown in FIG. 5, in the embodiment of the present application, the image processing device 15 may further include a person recognizing module 154, a face recognizing module 155, and a person marking module 156.

The person recognizing module 154 is connected to the image stitching module 153, and is configured to receive the integral conference image outputted by the image stitching module 153 and identify persons and person locations in the integral conference image to obtain person information and person location information in the integral conference image, wherein the person information can be indicative of size of person, contour profile of person, number of persons, etc., and the person location information can be indicative of position of person in the integral conference image. The person recognizing module 154 is further configured to transmit the person information and the person location information in the integral conference image, such that contour profile and location of a person, or marking box size and its location for a person can be determined according to the person information and the person location information. The face recognizing module 155 is connected to the image stitching module 153, and is configured to receive the integral conference image outputted by the image stitching module 153, and identify person names in the integral conference image and determine marking locations of person names to obtain person name information and marking location information of person names in the integral conference image; the face recognizing module 155 is further configured to transmit the person name information and the marking location information of person names in the integral conference image. The person marking module 156 is connected to the person recognizing module 154 and the face recognizing module 155 respectively, and is configured to receive the person information, the person location information, the person name information, and the marking location information of person names in the integral conference image, and mark persons and person names in the integral conference image according to the person information, the person location information, the person name information, and the marking location information of person names in the integral conference image, so as to form the integral conference image having person tags of all persons and person name tags of all persons. The person marking module 156 is connected to the image outputting module 159, and is configured to output the integral conference image having person tags of all persons/specific person(s) and person name tags of all persons/specific person(s) to the image outputting module 159.

Specifically, as shown in FIG. 5, in this embodiment, the image processing device 15 may include a plurality of image receiving modules 151, a correcting module 152, an image stitching module 153, a person recognizing module 154, and/or a face recognizing module 155, a person marking module 156, and an image outputting module 159. Each of the plurality of image receiving modules 151 is connected to the correcting module 152 respectively; the correcting module 152 is connected to the image stitching module 153; the image stitching module 153 is connected to the person recognizing module 154 and the face recognizing module 155 respectively; the person recognizing module 154 and the face recognizing module 155 are connected to the person marking module 156 respectively; and the person marking module 156 is connected to the image outputting module 159. It should be understood that the image processing device 15 may include only the person recognizing module 154, may only include the face recognizing module 155, or may include both the person recognizing module 154 and the face recognizing module 155. Hereinafter, description will be provided with the image processing device 15 includes both the person recognizing module 154 and the face recognizing module 155, however, it should be understood that in the case where the image processing device 15 includes only one of the two, the person marking module 156 operates based only on outputs of the corresponding module, and details will not be repeated here.

Each of the plurality of image receiving modules 151 is connected to one image acquisition device 14, receives a partial conference image, and transmits the partial conference image to the correcting module 152. The correcting module 152 receives a plurality of partial conference images transmitted by the plurality of image receiving modules 151, and corrects the plurality of partial conference images simultaneously, so that the plurality of partial conference images are simultaneously corrected into a plurality of plane images respectively, and the corrected plurality of planar images are transmitted to the image stitching module 153 for smooth seamless docking to form a complete integral conference image. In the stitching process, an image stitching algorithm is used, the image stitching algorithm is an algorithm that performs spatial matching and aligning on a group of image sequences partially overlapping each other, and resampling and synthesizing to form one integral new image having a wide viewing angle scene and a high definition and containing sequence information of each image. The process of image stitching consists of three steps, image acquisition, image alignment, and image synthesis, thereby overlapped image edges are removed, and then a method of for example smooth filtering is used at the edge of the images to achieve smooth seamless docking of the plurality of partial conference images.

The person recognizing module 154 and the face recognizing module 155 receive the integral conference image respectively. The person recognizing module 154 is used to identify persons and person locations in the integral conference image. Identifying persons and person locations means recognizing persons (for example, a contour of a human body) in the integral conference image, distinguishing persons in an integral conference image from other things such as a table, a chair, or an electric appliance, and obtaining person information and corresponding person location information in the integral conference image. The method for obtaining person information and person location information is an algorithm for perfoiining person recognition and person location recognition, and the algorithm may be, but not limited to, a deep learning algorithm. The deep learning algorithm refers to a set of algorithms using various machine learning algorithms to solve various problems such as images and texts over a multi-layer neural network. The face recognizing module 155 is configured to identify person names in the integral conference image and determine marking locations of person names, for example, a person face is identified by using a face recognition algorithm, and a name corresponding to the person face is found out from a stored library of the system, and locations (i.e., marking locations of person names) of edges (for example, an upper edge) of the face of the recognized person are for example determined so as to mark the found corresponding name. The recognition algorithm may be, but not limited to, a deep learning algorithm, thereby name information of each person in the integral conference image and corresponding marking location information of each person name are obtained.

The person recognizing module 154 and the face recognizing module 155 respectively transmit the person information, the person location information, the person name information, and the marking location information of person names in the integral conference image to the person marking module 156. The person marking module 156 marks persons and person names in the integral conference image according to the person information, the person location information, the person name information, and the marking location information of person names in the integral conference image. For example, the person marking module 156 may form an integral conference image having person tags of all persons and person name tags of all persons; or may form an integral conference image having a person tag of a current speaker as needed; or may form an integral conference image having a person tag of a current speaker and person name tags of all persons as needed; or may form an integral conference image having a person tag and person name tag of a current speaker as needed; or may form an integral conference image having person name tags of all persons as needed, for example, a colored rectangular frame may be used to mark a person according to the person information and the person location information, or the area where persons appear may be highlighted, or persons may be marked in other ways. For example, person names may be marked in the form of text at the marking location of person names based on the person name information and the marking location information of person names, such as above the top of persons. The process of marking is dynamic and real-time, so the marking location changes as the person location changes, i.e., changing dynamically in real time along with the persons.

The person marking module 156 is further configured to transmit the integral conference image to the image outputting module 159. For example, in the case where the person marking module 156 marks person tags of all persons and person name tags of all persons, the person marking module 156 transmits the integral conference image having person tags of all persons and person name tags of all persons to the image outputting module 159, thereafter the image outputting module 159 transmits the integral conference image having person tags of all persons and person name tags of all persons to the display device for displaying, so that the conference image contains person tags of all persons and person names of all persons, that is, each conference participant 26 is marked, and the name of each conference participant 26 is correspondingly marked, so that each conference participant 26 26 can recognize all persons in the conference image, as well as the names of all persons. which facilitates each conference participant 26 sharing information, improves the sense of immersion and participation, for example, it facilitates mutual salutation between strangers.

As shown in FIGS. 1 to 3, in the embodiment of the present application, the conference terminal 1 further comprises: a plurality of voice acquisition devices 16 disposed circumferentially on an outer surface of the fixing frame 12 and a voice processing device 17 (not shown in FIGS. 1 to 3) being connected to the plurality of voice acquisition devices 16 respectively.

Each of the plurality of voice acquisition devices 16 is configured to acquire a partial conference voice, a plurality of partial conference voices collectively constitute an integral conference voice, and each of the plurality of voice acquisition devices 16 is further configured to output a conference voice. The voice processing device 17 is configured to receive and process a plurality of partial conference voices, convert the plurality of partial conference voices into speech voices, and the voice processing device 17 is further configured to output the speech voices.

In this embodiment, the conference terminal 1 comprises a plurality of voice acquisition devices 16 and a voice processing device 17. As shown in FIG. 1, a distance of the plurality of voice acquisition devices 16 from the conference participants is closer than a distance of the plurality of image acquisition devices 14 from the conference participants. The plurality of voice acquisition devices are disposed around a periphery of the fixing frame, and the plurality of image acquisition devices are also disposed around a periphery of the fixing frame. When the conference terminal is disposed at the center of the conference table, the plurality of image acquisition devices are located above the plurality of voice acquisition devices, so that the voice acquisition device can be closer to the conference participants, and the image acquisition device is farther from the conference participants, thereby being able to acquire a wider range of conference image. The plurality of voice acquisition devices are circumferentially disposed apart one another on the fixing frame 12, and each of the plurality of voice acquisition devices is configured to acquire the partial conference voice in real time. The partial conference voice acquired by each voice acquisition device is all the voices that the voice acquisition device can acquire, and the plurality of voice acquisition devices can acquire the speeches performed by all the participants in the conference, so that the plurality of partial conference voices acquired by all the voice acquisition devices together form an integral conference voice. In general, the conference participants 26 will not all speak as speakers at the same time, so the plurality of partial conference voices will not be all acquired simultaneously. The integral conference voice refers to all conference speeches made during the entire conference time. The plurality of voice acquisition devices are connected to the voice processing device, the voice processing device receives the plurality of partial conference voices in real time, and converts the plurality of partial conference voices to obtain speech voices. The speech voices refer to the speech made by all the speakers, and the voice processing device is further configured to output the speech voices to an acoustic device.

The voice acquisition device 16 may be a microphone. The voice acquisition device 16 may also be other devices that can be used to acquire voice. The voice processing device 17 is a CPU, a DSP, or the like. The voice processing device 17 may be provided with a receiving port and an output port, and the receiving port and the output port may be protocol interfaces such as an LVDS interface, a MIPI interface, a DVI, an HDMI or a DP interface. Therefore, the conference terminal 1 provided by the present application can acquire the conference voices and play the converted speech voices, so that the participants can hear the speeches of all the speakers.

The plurality of image acquisition devices 14 and the plurality of voice acquisition devices 16 perform acquisition simultaneously, and synchronously transmit the acquired images and voices to the image processing device 15 and the voice processing device 17, respectively. The image processing device 15 and the voice processing device 17 synchronously process the received images and voices, and synchronously transmit the processed images and voices to the display device and the acoustic device for displaying and playback, thereby realizing synchronous playback of image and sound.

Figure 6:
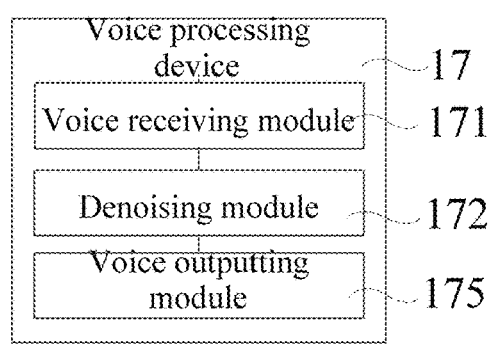
FIG. 6 is a composition block diagram of a voice acquisition device according to an embodiment of the present application.

As shown in FIG. 6, in the embodiment of the present application, the voice processing device 17 may include a plurality of voice receiving modules 171, a denoising module 172, and a voice outputting module 175. Each of the plurality of voice receiving modules 171 is connected to a voice acquisition device 16, and is configured to receive a partial conference voice, and amplify the partial conference voice and perform analog-to-digital conversion to form partial voice data, and the voice receiving module 171 is further configured to output the partial voice data. The denoising module 172 is connected to the plurality of voice receiving modules 171, and is configured to receive a plurality of partial voice data, and perform denoising processing on the plurality of partial voice data to obtain speech data, the denoising module 172 is further configured to transmit the speech data. The speech outputting module 175 is connected to the denoising module 172, and is configured to receive the speech data, perform digital-to-analog conversion on the speech data to form speech voices, and the voice outputting module 175 is further configured to output the speech voices.

In this embodiment, each of the plurality of voice receiving modules 171 is connected to a voice acquisition device 16, receives the partial conference voice, amplifies the partial conference voice, and performs analog-to-digital conversion and other processing on the partial conference voice, so as to form voice data and transmit the voice data to the denoising module 172. The denoising module 172 simultaneously performs denoising processing on the received plurality of voice data, thereby retaining voice data having human voices, and then further removing noise in the retained voice data so as to obtain speech data. The speech data may be one or more. When the plurality of voice acquisition devices 16 all acquire the speech of the speaker, the number of the speech data is plural. However, each of the voice acquisition devices 16 is different in distance from the speaker, so that loudness of the plurality of speech data is different. The denoising module 172 is further configured to determine loudness of the plurality of speech data, and transmit the speech data with the highest loudness and the lowest noise to the voice outputting module 175. The voice outputting module 175 performs analog-to-digital conversion on the speech data received from the denoising module 172, and then transmits the data to the acoustic device for playback on the acoustic device. Thus, other conference participants 26 can also hear the voice of the speaker.

Figure 7A:
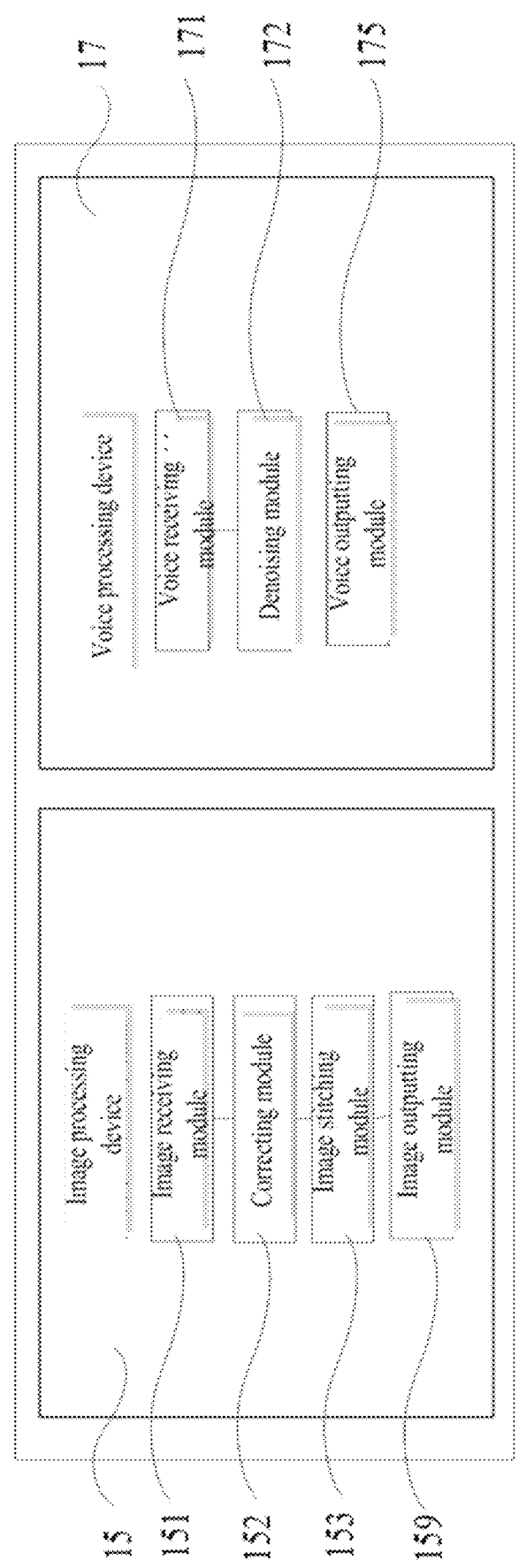

FIG. 7A shows a schematic block diagram of an image voice processing system including the image processing device of FIG. 4 and the voice processing device of FIG. 6 according to an embodiment of the present application.

FIG. 7B shows a schematic block diagram of an image voice processing system including the image processing device of FIG. 5 and the voice processing device of FIG. 6 according to another embodiment of the present application.

Figure 7C:
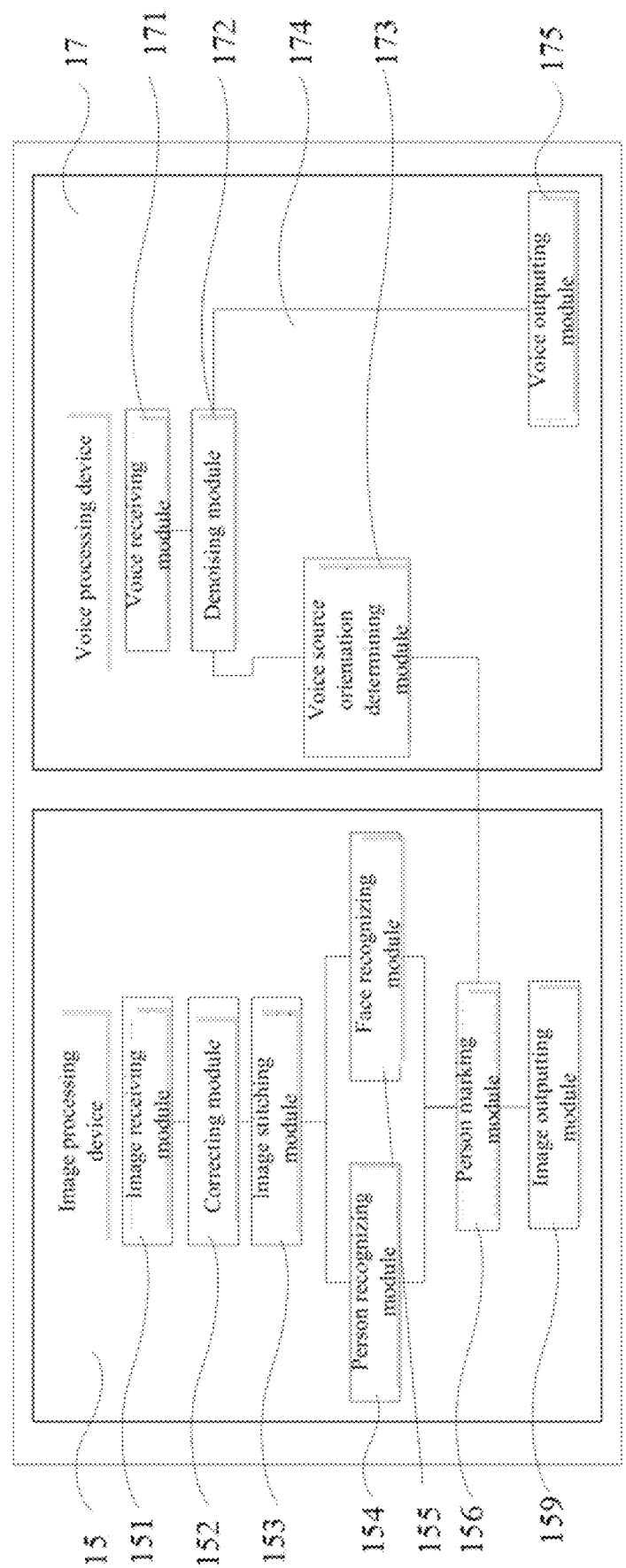
Figure 7D:
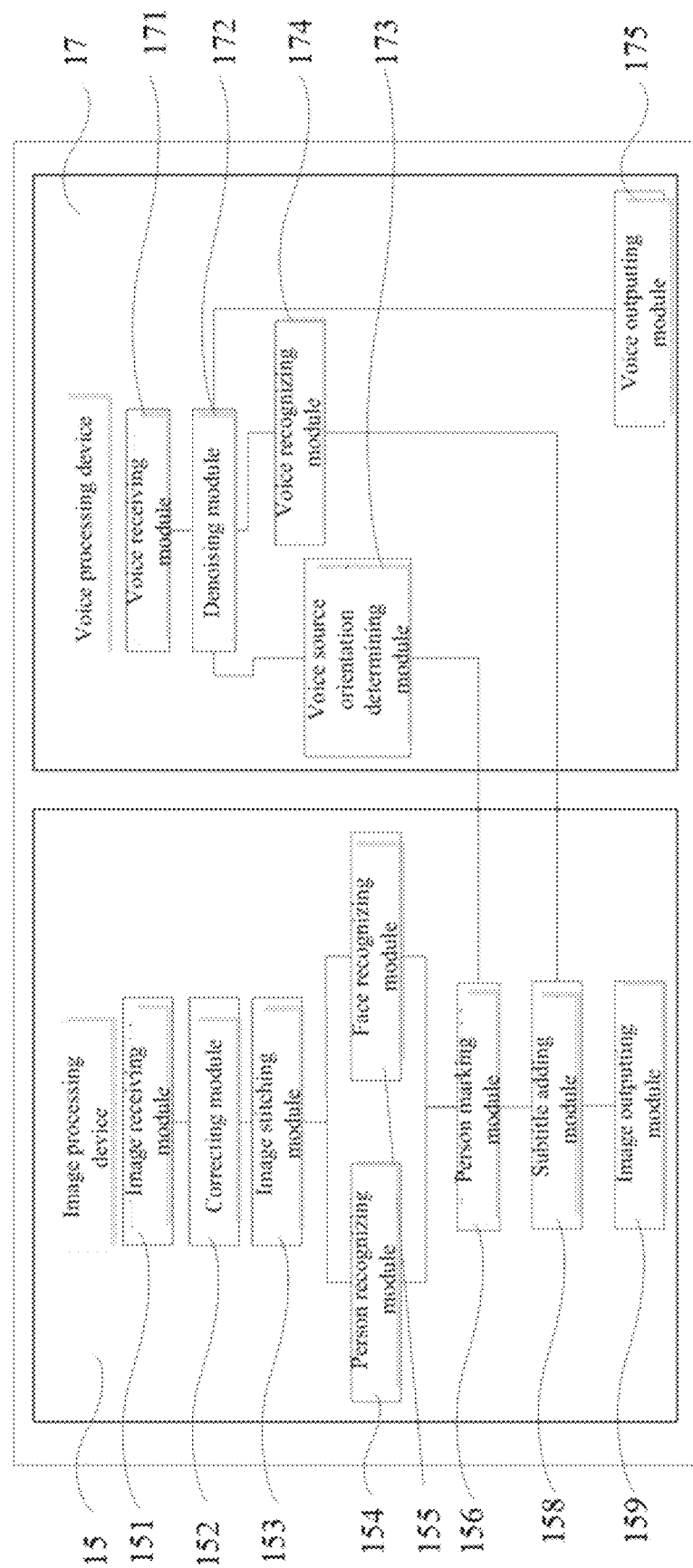

FIGS. 7C and 7D show schematic block diagrams of an image voice processing system including the image processing device of FIG. 5 and the voice processing device of FIG. 6 according to two further embodiments of the present application.

As shown in FIG. 7C, in the embodiment of the present application, based on the voice processing device 17 shown in FIG. 6, the voice processing device 17 may further include a voice source orientation determining module 173. The voice source orientation determining module 173 is connected to the denoising module 172, and is configured to receive the speech data, and determine location information of a speaker according to the speech data. The voice source orientation determination module 173 is further configured to output location information of the speaker. The method of determining the location information of the speaker based on the speech data of the speaker is determining the location information of the speaker, according to the received speech data, using the method based on beamforming, the method based on high resolution spectrum estimation, or the method based on vocal delay difference.

The person marking module 156 of the image processing device 15 can receive the location information of the speaker generated by the voice source orientation determining module 173, and generate an integral conference image having a person tag of the speaker and person name tags of all persons, according to the person information and the person location information outputted by the person recognizing module 154 and the person name and the person name location information outputted by the face recognizing module 155.

Further, as shown in FIG. 7D, in the embodiment of the present application, on the basis of the voice processing device 17 shown in FIG. 7C, the voice processing device 17 may further include a voice recognizing module 174. The voice recognizing module 174 is connected to the denoising module 172 and is configured to receive the speech data and convert the speech data into text information, and the speech recognizing module 174 is further configured to output the text information. As shown in FIG. 7D, on the basis of the image processing device 15 shown in FIG. 5, the image processing device 15 may further include a subtitle adding module 158. The subtitle adding module 158 is configured to receive the integral conference image having a person tag of only the speaker and person name tags of all persons and the text information, and add the text information to the integral conference image having a person tag of only the speaker and person name tags of all persons, thus forming the integral conference image having subtitles and tags. Subtitles are typically added at the bottom of the integral conference image, and the subtitles can be displayed in real time at the bottom of the conference image based on the results of the speech recognition. The subtitle adding module 158 is further configured to transmit an integral conference image having subtitles and tags to the image outputting module 159.

However, it should be understood that the voice processing device 17 may only include a voice recognizing module 174 that cooperates with the subtitle adding module 158 of the image processing device. The image processing device 15 may not include the person recognizing module 154, the face recognizing module 155, and the person marking module 156. The subtitle adding module 158 superimposes the subtitle text information on the basis of the image outputted by the image stitching module 153.

Figure 7E:
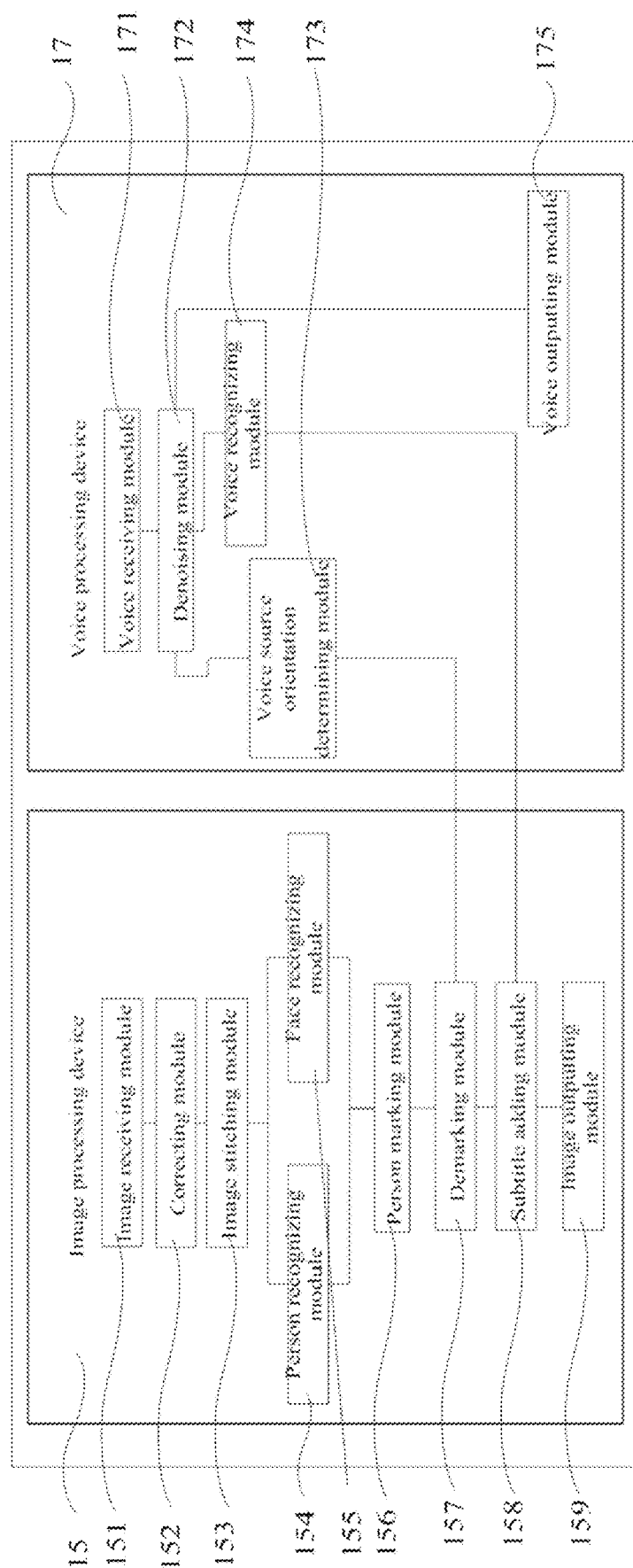

FIG. 7E shows a schematic block diagram of an image voice processing system according to yet another embodiment of the present application.

As shown in FIG. 7E, on the basis of the image processing device 15 shown in FIG. 5, the image processing device 15 may further include a demarking module 157 and a subtitle adding module 158.

In the embodiment illustrated in FIG. 7E, the person marking module 156 generates an integral conference image having person tags of all persons and person name tags of all persons. The demarking module 157 is respectively connected to the voice source orientation determining module 173 and the person marking module 156, and is configured to receive location information of the speaker and an integral conference image having person tags of all persons and person name tags of all persons, and remove, according to the location information of the speaker, person tags of the other persons except the speaker in the integral conference image having person tags of all persons and person name tags of all persons, thus forming an integral conference image having only the person tag of the speaker and person name tags of all persons. The demarking module 157 is further configured to transmit the integral conference image having the person tag of only the speaker and person name tags of all persons. The subtitle adding module 158 is respectively connected to the demarking module 157 and the speech recognizing module 174, and is configured to receive an integral conference image having the person tag of only the speaker and person name tags of all persons and the text information, and add the text information to integral conference image having the person tag of only the speaker and person name tags of all persons, thus forming an integral conference image having subtitles and tags. Subtitles are typically added at the bottom of the integral conference image, and the subtitles can be displayed in real time at the bottom of the conference image based on the results of voice recognition. The subtitle addition module 158 is further configured to transmit an integral conference image with subtitles and tags to the image outputting module 159.

In this embodiment, the voice processing device 17 includes a plurality of voice receiving modules 171, a denoising module 172, a voice source orientation determining module 173, a voice recognizing module 174, and a voice outputting module 175. The image processing device 15 includes a plurality of image receiving modules 151, a correcting module 152, an image stitching module 153, a person recognizing module 154, a face recognizing module 155, a person marking module 156, a demarking module 157, a subtitle adding module 158, and an image outputting module 159. The plurality of voice receiving modules 171 are connected to the denoising module 172; the denoising module 172 is connected to the voice source orientation determining module 173, the voice recognizing module 174, and the voice outputting module 175, respectively; each of the plurality of image receiving module 151 is connected to the correcting module 152 respectively; the correcting module 152 is connected to the image stitching module 153; the image stitching module 153 is connected to the person recognizing module 154 and the face recognizing module 155, respectively; the person recognizing module 154 and the face recognizing module 155 are also connected to the person marking module 156, respectively; the person marking module 156 and the voice source orientation determining module 173 are respectively connected to the demarking module 157; the demarking module 157 and the voice recognizing module 174 are respectively connected to the subtitle adding module 158; and the subtitle adding module 158 is connected to the image outputting module 159.

Each of the voice receiving modules 171 is connected to a voice acquisition device 16, and receives a partial conference voice, amplifies the partial conference voice, and performs analog-to-digital conversion and other processing on the partial conference voice, so as to form voice data and transmit the voice data to the denoising module 172. The denoising module 172 simultaneously performs denoising processing on the received plurality of voice data, thereby retaining voice data having human voices, and then further removing noise in the retained voice data so as to obtain speech data. The algorithm for obtaining the speech data may be, but not limited to, a deep learning algorithm. The speech data may be one or more. When a plurality of voice acquisition devices 16 acquire the speech of the speaker, the number of the speech data is plural. However, each of the voice acquisition devices 16 is different in distance from the speaker, so that loudness of the plurality of speech data is different. The denoising module 172 has a voice loudness determination mechanism for determining loudness of the plurality of speech data, and transmits the speech data with the highest loudness and the lowest noise to the voice recognizing module 174 and the voice outputting module 175. The voice recognizing module 174 converts the speech data into text information and forwards the text information to the subtitle adding module 158. The denoising module 172 is further configured to transmit the speech data to the voice source orientation determining module 173. The voice source orientation determining module 173 determines location information of the speaker based on one or more speech data, and transmits the location information of the speaker to the demarking module 157.

Each of the plurality of image receiving module 151 is connected to an image acquisition device 14, receives a partial conference image, and transmits the partial conference image to the correcting module 152. The correcting module 152 receives a plurality of partial conference images transmitted by the plurality of image receiving modules 151, and simultaneously corrects the plurality of partial conference images, so that the plurality of partial conference images are simultaneously corrected into a plurality of planar images respectively, and the corrected plurality of planar images are transmitted to the image stitching module 153 for smooth seamless docking so as to form a complete integral conference image.

The person recognizing module 154 and the face recognizing module 155 respectively receive the integral conference image. The person recognizing module 154 is configured to identify persons and person locations in the integral conference image, and obtain person information and person location information in the integral conference image. The face recognizing module 155 is configured to identify person names in the integral conference image and determine marking locations of person names, and obtain person name information and marking location information of person names in the integral conference image. The person recognizing module 154 and the face recognizing module 155 respectively transmit person information, person location information, person name information, and marking location information of person names in the integral conference image to the person marking module 156.

The person marking module 156 marks persons and person names in the integral conference image based on the person information, the person location information, the person name information, and the marking location information of person names to form an integral conference image having all persons and all person names. The person marking module 156 is further configured to transmit the integral conference image having person tags of all persons and person name tags of all persons to the demarking module 157.

The demarking module 157 removes person tags of the persons other than the speaker in the integral conference image having person tags of all person and person name tags of all persons transmitted by the person marking module 156, according to the speaker location information transmitted by the voice source orientation determining module 173, thus obtains an integral conference image having a person tag of only the speaker and person name tags of all persons, and transmits the integral conference image having a person tag of only the speaker and person name tags of all persons to the subtitle adding module 158.

The subtitle adding module 158 receives the integral conference image having a person tag of only the speaker and person name tags of all persons sent by the demarking module 157 and the text information sent by the voice recognizing module 174, and adds the text information to the integral conference image having a person tag of only the speaker and person name tags of all persons, thus forming an integral conference image having subtitles and tags. The subtitle adding module 158 transmits the integral conference image having subtitles and tags to the image outputting module 159.

The image outputting module 159 transmits the integral conference image having subtitles and tags to the display device for displaying on the display device. At the same time, the voice outputting module 175 transmits the speech voice to the acoustic device for playing on the acoustic device.

Figure 8:
FIG. 8 is a schematic diagram of a conference image according to an embodiment of the present application.

As shown in FIG. 8, the conference terminal 1 provided by the present application realizes seamless panoramic viewing of conference scenes in a conference, and highlights the speaker in the conference image, so that even when a plurality of persons have conversation or the speaker is switched repeatedly, the plurality of speakers can also be marked or the tag of the speaker can be switched quickly, accordingly, the participants can clearly identify who is speaking or talking, the participants can quickly identify the speaker, effectiveness and efficiency of the conference are improved, there is no loss of other conference participants 26 or scenes while the speaker is highlighted. The person name of each conference participant 26 is also marked in the conference image, avoiding embarrassment caused by the fact that when many people who do not know each other attend the conference, it is difficult for the participants to remember the name of the strangers. In addition, the conference image also has subtitles, so that people suffering from ear problems can also participate in the conference normally.

In the embodiment of the present application, the image acquisition device 14 is a wide-angle camera, and the wide-angle camera is used to acquire a partial conference image.

In this embodiment, the image acquisition device 14 is a wide-angle camera. Preferably, the image acquisition device 14 is a fisheye camera such that each image acquisition device 14 is capable of photographing a larger range, thus the number of image acquisition devices 14 disposed circumferentially on the fixing frame 12 can be reduced, thereby cost can be reduced.

As shown in FIG. 1, in the embodiment of the present application, the conference terminal 1 further comprises: a lifting bracket connected to the fixing frame 12 and configured to drive lifting and lowering of the fixing frame 12.

In this embodiment, a lifting device 18 is also included, and the lifting device 18 includes a motor. Lifting and lowering operations of the lifting device 18 can be achieved by the driving of the motor, thus carrying the fixing frame 12 connected to the lifting device 18 to be lifted and lowered, so that the conference terminal 1 can adjust heights of the plurality of image acquisition devices 14 and the plurality of voice acquisition devices 16 on the fixing frame 12 according to different conferences, thereby enabling the conference terminal 1 to better acquire the conference image and the conference voice.

In an embodiment of the application, the voice acquisition device may be a microphone.

The fixing frame is an annular fixing frame, a top of an outer surface of the annular fixing frame is uniformly provided with for example four wide-angle cameras circumferentially, and a central portion of the outer surface of the annular fixing frame is uniformly provided with for example eight microphones circumferentially.

As shown in FIGS. 1 to 3, in this embodiment, the fixing frame is an annular fixing frame, optionally, the fixing frame 12 is a cylindrical fixing frame 12, the conference table 28 is a circular conference table 28, and the fixing frame 12 is disposed in the center of the circular conference table 28, the persons attending the conference surround one circle or a half of the circle of the circular conference table 28. As shown in FIG. 2, the top of the outer surface of the fixing frame 12 is uniformly provided with four wide-angle cameras in a circumferential direction, and each wide-angle camera has a shooting angle of 90°, so that four uniformly arranged wide-angle cameras with a viewing angle of 90° can make a complete acquisition of the integral conference image around the fixing frame 12. As shown in FIG. 3, the middle location of the outer surface of the fixing frame 12 is uniformly provided with eight microphones in the circumferential direction, and the eight microphones can complete acquisition of speeches of all the speakers, thereby realizing acquisition of conference voices.

An embodiment of the present application further provides a conference system 2 comprising the above-described conference terminal 1 located at a first location; a display device located at a second location, and an acoustic device located at the second location. The display device located at a second location is connected to the image outputting module 159 and is configured for receiving and displaying an integral conference image. The acoustic device located at a second location is connected to the voice outputting module 175, and is configured to receive and play the speech voice. The conference terminal 1 at the first location, the display device at the second location, and the acoustic device communicate via a communication network 24.

In this embodiment, the conference system 2 provided by the present application comprises a conference terminal 1, a display device, and an acoustic device. The image outputting module 159 in the conference terminal 1 is connected to the display device, the display device is configured to display an integral conference image. The acoustic device is connected to the voice outputting module 175 of the conference terminal 1, and the acoustic device is configured to play the speech voice. The display device and the acoustic device are integrated on a playback device 22 for synchronous playback. The displayed conference image of the conference system 2 provided by the present application is complete, without losing any conference scenes and images of conference participants, so that any conference participants 26 can see the gestures, expressions, etc. of the conference participants 26 other than the speaker, and conference voices can be played while the conference image is displayed so that any conference participants can get all the information of the conference.

Optionally, the display device is a 360-degree annular display device, and the 360-degree annular display device is integrated on the outer surface of the fixing frame to realize the display function.

Figure 9:
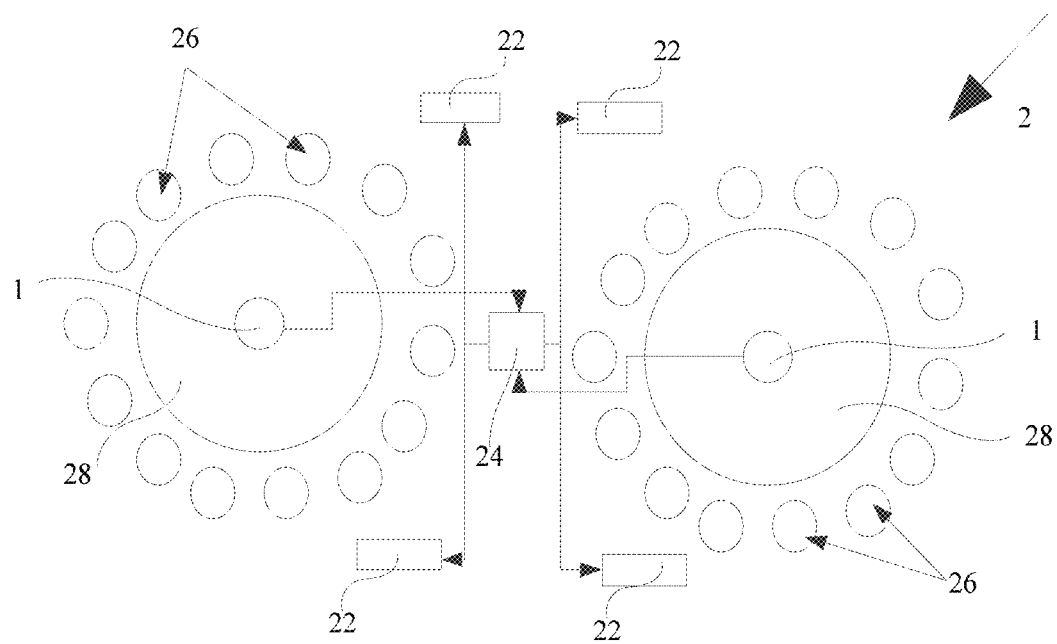
FIG. 9 is a schematic diagram of a conference system according to an embodiment of the present application.

As shown in FIG. 9, in the embodiment of the present application, the conference system 2 further comprises: the above-described conference terminal 1 located at a second location; a display device located at the first location; and an acoustic device located at the first location. The conference terminal 1 located at the second location, the display device and the acoustic device at the first location communicate via a communication network 24.

As shown in FIG. 9, in the embodiment of the present application, there are a plurality of conference terminals 1, each conference room 1 is provided with one conference terminal 1, and there are a plurality of display devices and a plurality of acoustic devices, the plurality of display devices and the plurality of acoustic devices are located in different conference rooms respectively.

The image outputting module 159 and the voice outputting modules 175 of each conference terminal 1 are connected to the communication network 24, the communication network 24 is configured to receive an integral conference image having subtitles and tags as well as speech voices of a plurality of conference terminals 1. The communication network 24 is connected to a plurality of display devices, and is configured to transmit an integral conference image to the plurality of display devices. The communication network 24 is connected to an acoustic device, and is configured to transmit speech voice to the acoustic device.

In this embodiment, in a large-sized video conference, usually a large number of persons in different conference rooms participate in the conference, so each conference room may be provided with one conference terminal 1, and each conference terminal 1 is connected to a plurality of display devices and a plurality of acoustic devices in different conference rooms via the communication network 24, thereby the integral conference image and the voice speech can be transmitted to the plurality of display devices and the plurality of acoustic devices, so that persons in each conference room can see images and hear voices in any other conference room, which ensures that when conference is occurring in multiple conference rooms, the participants can fully see and hear the situations in all conference rooms.

Optionally, for a specific conference room, a display device and an acoustic device for displaying the integral conference image and the speech voice of the specific conference room may be set in the specific conference room, also, the display device for displaying the integral conference image of the specific conference room may not be provided in the specific conference room, and the acoustic device for playing voices in the specific conference room may not be provided in the specific conference room.

The present application provides a conference terminal 1 and a conference system 2. The conference terminal 1 realizes a seamless panoramic view during the conference, and highlights the speaker in the conference image, so that even when a plurality of persons have conversation or the speaker is switched repeatedly, the plurality of speakers can also be marked or the tag of the speaker can be switched quickly, accordingly, the participants can clearly identify who is speaking or talking, the participants can quickly identify the speaker, effectiveness and efficiency of the conference are improved, there is no loss of other conference participants 26 or scenes while the speaker is highlighted. The person name of each conference participant 26 is also marked in the conference image, avoiding embarrassment caused by the fact that when many people who do not know each other attend the conference, it is difficult for the participants to remember the name of the strangers. In addition, the conference image also has subtitles, so that people suffering from ear problems can also participate in the conference normally. The conference terminal 1 enables the persons in each conference room to see images and hear voices in any other conference room, ensuring that when the conference is occurring in multiple conference rooms, the participants can fully see and hear the situations in all the conference rooms.

The above is only the specific embodiments of the present application, the protection scope of the present application is not limited thereto, and any modifications or substitutions that can be easily conceived of by those skilled in the art within the technical range reveled by the present application fall into the protection scope of the present application. Therefore, the protection scope of the present application should be determined by the protection scope of the claims.

What is claimed is:

1. A conference terminal, comprising:
    a plurality of image acquisition devices, each of the image acquisition devices being configured to acquire a partial conference image;
    an image processing device configured to receive a plurality of partial conference images from the plurality of image acquisition devices, convert the plurality of partial conference images into one integral conference image, and output the integral conference image;
    a plurality of voice acquisition devices, each of the voice acquisition devices being configured to acquire a partial conference voice; and
    a voice processing device configured to receive a plurality of partial conference voices from the plurality of voice acquisition devices, obtain speech data based on the plurality of partial conference voices, convert the speech data into speech voices, and output the speech voices, wherein
    the voice processing device includes a voice source orientation determining module configured to determine location information of a speaker according to the speech data, wherein
    the image processing device includes a person recognizing module and a person marking module;
    the person recognizing module is configured to receive the integral conference image, and identify persons and person locations in the integral conference image to obtain person information and person location information in the integral conference image;
    the person marking module is configured to receive the location information of the speaker, and form the integral conference image having a person tag of the speaker based on the location information of the speaker, the person information, and the person location information.

2. The conference terminal according to claim 1, wherein the image processing device includes a correcting module, an image stitching module, and an image outputting module;
    the correcting module is configured to receive the plurality of partial conference images, and correct the plurality of partial conference images into a plurality of planar images respectively;
    the image stitching module is configured to receive the plurality of planar images outputted by the correcting module, and perform smooth docking on the plurality of planar images to form the integral conference image;
    the image outputting module is configured to output the integral conference image.

3. The conference terminal according to claim 2, wherein the image processing device further includes a face recognizing module;
    the face recognizing module is configured to receive the integral conference image, and identify person names in the integral conference image and determine marking locations of the person names to obtain person name information and marking location information of person names in the integral conference image;
    the person marking module is further configured to receive the person information, the person location information, the person name information, and the marking location information of person names in the integral conference image, and mark the person names in the integral conference image according to the person information, the person location information, the person name information, and the marking location information of person names in the integral conference image, so as to form the integral conference image having person name tags.

4. The conference terminal according to claim 3, wherein the voice processing device includes a denoising module and a voice outputting module;
    the denoising module is configured to receive a plurality of partial voice data, and perform denoising processing on the plurality of partial voice data to obtain speech data;
    the voice outputting module is configured to receive the speech data, and perform digital-to-analog conversion on the speech data to form speech voices.

5. The conference terminal according to claim 4, wherein the voice processing device further includes a voice source orientation determining module, the voice source orientation determining module is configured to receive the speech data, and determine location information of a speaker according to the speech data;
    the image processing device further includes a demarking module,
    wherein the marking module forms the integral conference image having person tags of all persons and person name tags of all persons, and the demarking module causes, according to the location information of the speaker, only the speaker to have a person tag in the integral conference image having person tags of all persons and person name tags of all persons, so as to form the integral conference image with person tags of only the speaker and person name tags of all persons.

6. The conference terminal according to claim 1, wherein the voice processing device further includes a voice recognizing module;
    the voice recognizing module is configured to receive the speech data, and convert the speech data into text information;
    the image processing device further includes a subtitle adding module; the subtitle adding module adds the text information to the integral conference image so as to form the integral conference image having subtitles.

7. The conference terminal according to claim 1, further comprising:
a fixing frame,
wherein the plurality of image acquisition devices are circumferentially disposed on an outer surface of the fixing frame, and the plurality of voice acquisition devices are circumferentially disposed on the outer surface of the fixing frame.

8. The conference terminal according to claim 7, further comprising:
a lifting bracket connected to the fixing frame and configured to drive lifting and lowering of the fixing frame.

9. The conference terminal according to claim 7, wherein the voice acquisition device is a microphone;
the image acquisition device is a wide-angle camera;
the fixing frame is an annular fixing frame, a top of an outer surface of the annular fixing frame is uniformly provided with four wide-angle cameras circumferentially, and a central portion of the outer surface of the annular fixing frame is uniformly provided with eight microphones circumferentially.

10. A conference system comprising:
a conference terminal according to claim 1, which is located at a first location;
a display device located at a second location and configured to receive and display an integral conference image outputted by the image outputting module of the conference terminal located at the first location; and
an acoustic device located at the second location and configured to receive and play speech voices outputted by the voice outputting module of the conference terminal located at the first location.

11. The conferencing system according to claim 10, further comprising:
a conference terminal located at the second location;
a display device and an acoustic device located at the first location,
wherein the display device at the first location is configured to receive and display the integral conference image outputted by the image outputting module of the conference terminal located at the second location;
the acoustic device located at the first location is configured to receive and display speech voices outputted by the voice outputting module of the conference terminal located at the second location.

* * * * *